(12) United States Patent
Azanza Ladrón et al.

(10) Patent No.: US 8,704,398 B2
(45) Date of Patent: Apr. 22, 2014

(54) ELECTRIC GENERATOR AND PROCESS FOR ASSEMBLING A WIND TURBINE EQUIPPED WITH THE GENERATOR

(75) Inventors: Eduardo Azanza Ladrón, Sarriguren (ES); José Miguel Garcia Sayés, Sarriguren (ES); Teresa Arlabán Gabeiras, Sarriguren (ES); Miguel Núñez Polo, Sarriguren (ES)

(73) Assignee: Acciona Windpower, S.A., Sarriguren, Navarra (ES)

( * ) Notice: Subject to any disclaimer, the term of this patent is extended or adjusted under 35 U.S.C. 154(b) by 160 days.

(21) Appl. No.: 13/207,514

(22) Filed: Aug. 11, 2011

(65) Prior Publication Data

US 2012/0038169 A1 Feb. 16, 2012

(30) Foreign Application Priority Data

Aug. 11, 2010 (ES) .................................. 201031248

(51) Int. Cl.
*F03D 9/00* (2006.01)
(52) U.S. Cl.
USPC ............................................. 290/55; 290/44

(58) Field of Classification Search
USPC ..................................................... 290/44, 55
See application file for complete search history.

(56) References Cited

U.S. PATENT DOCUMENTS

| 5,844,341 | A | 12/1998 | Spooner et al. | |
|---|---|---|---|---|
| 7,456,534 | B2 | 11/2008 | Engstrom | |
| 7,944,076 | B2 | 5/2011 | Stiesdal | |
| 8,373,298 | B2 * | 2/2013 | Barber | 290/55 |
| 2008/0150294 | A1 * | 6/2008 | Jones | 290/55 |

FOREIGN PATENT DOCUMENTS

| DE | 10255745 | 6/2004 |
|---|---|---|
| EP | 2063115 | 5/2009 |

* cited by examiner

*Primary Examiner* — Tho D Ta
(74) *Attorney, Agent, or Firm* — Merchant & Gould P.C.

(57) ABSTRACT

A generator having a rotor which comprises rotor excitation element-carrying modules, for example magnets, radially movable in relation to the generator shaft in such a manner, when in their retracted position, as to significantly ease generator transport and assembly. The use of these movable magnet-carrying modules is particularly useful in direct drive-type generators which do not require a multiplier. Another object of the invention is an assembly process which comprises a generator equipped with the radially movable magnet-carrying modules.

28 Claims, 9 Drawing Sheets

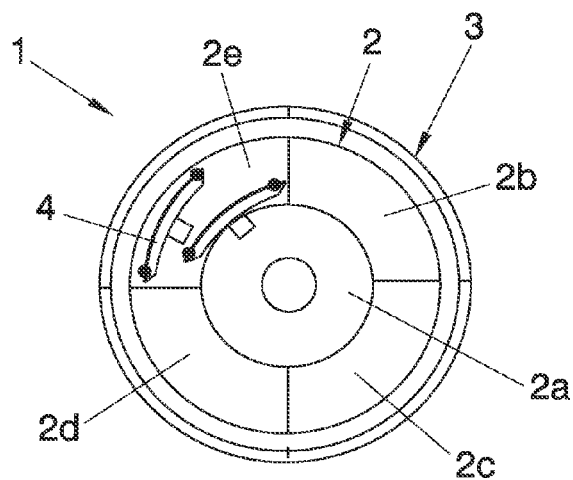
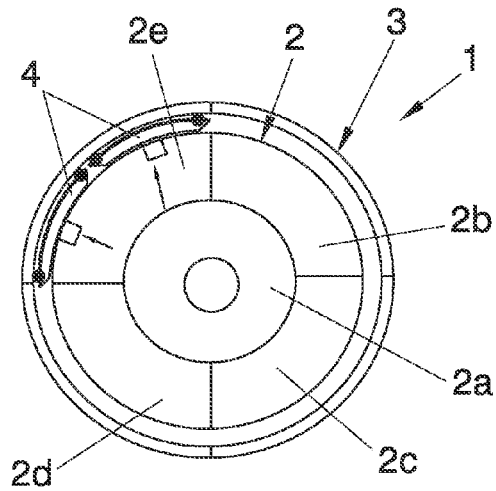
FIG. 1a  FIG. 1b
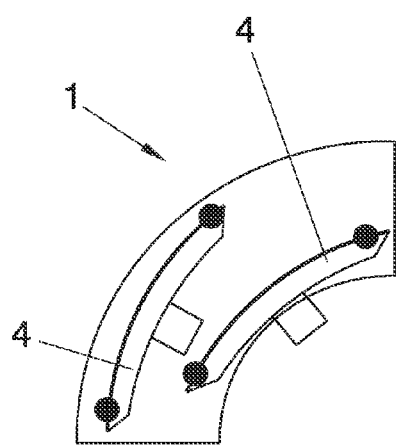
FIG. 2

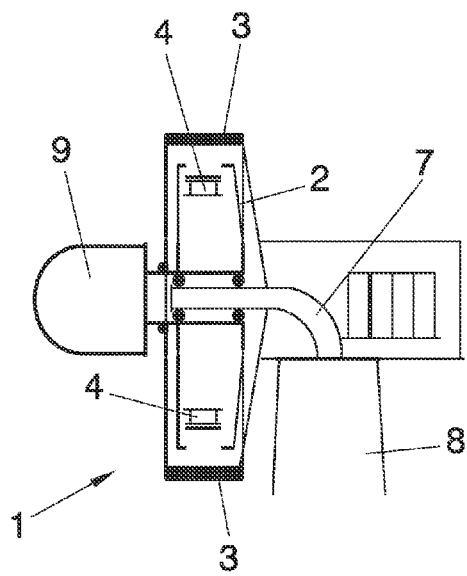
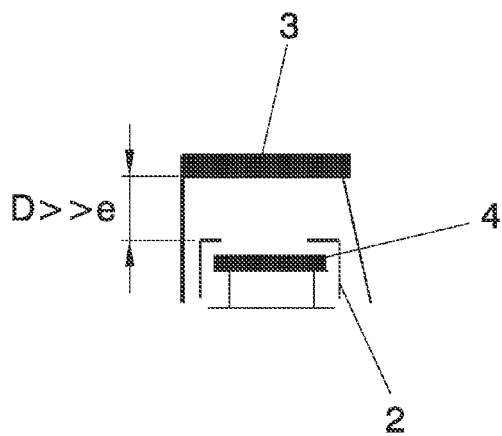
FIG. 3a
FIG. 3b
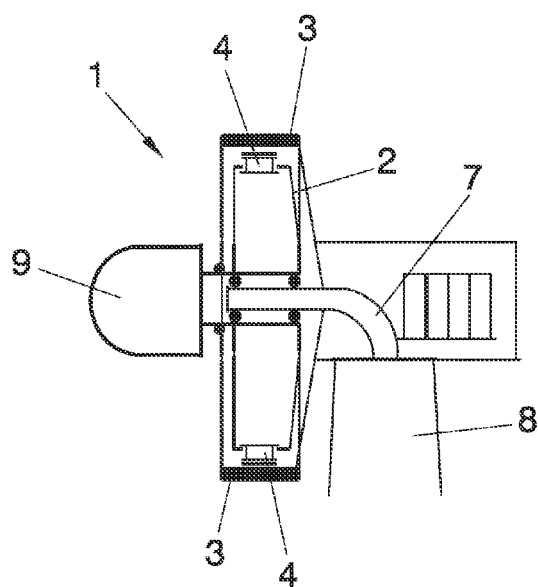
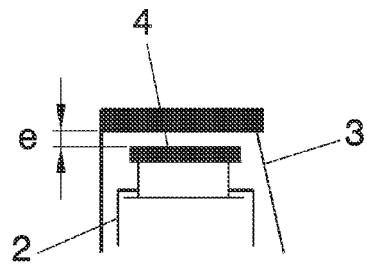
FIG. 4a
FIG. 4b

ELECTRIC GENERATOR AND PROCESS FOR ASSEMBLING A WIND TURBINE EQUIPPED WITH THE GENERATOR

OBJECT OF THE INVENTION

The object of the present invention is a generator having a rotor which comprises rotor excitation element-carrying modules, for example magnets, radially movable in relation to the generator shaft in such a manner, when in their retracted position, as to significantly ease generator transport and assembly. The use of these movable magnet-carrying modules is particularly useful in direct drive-type generators which do not require a multiplier.

Another object of the invention is a process for assembling a wind turbine which comprises a generator equipped with said radially movable rotor excitation element-carrying modules.

BACKGROUND OF THE INVENTION

Up until now, most wind turbines used a multiplier to increase the rotation speed of the shaft coupled to the generator. However, the current trend in the manufacture of wind turbines with increasingly higher power output is to suppress the multiplier in the power conversion system, with the object of reducing the number of components and maintenance needs. This implies low rotation speed on coinciding with that of the wind rotor (maximum speed between 10 rpm and 12 rpm for a 6 MW machine) and, in turn, very high wind turbine torque. These types of multiplierless generators are normally known as "direct drive."

The dimensions of these types of electric generators (diameter and length) depend on the torque achieved, being preferable to increase the diameter in relation to the length in order to optimise the weight and cost of the active parts (copper and permanent magnets, as well as magnetic material). This implies that the dimensions of a direct drive electric generator are often much larger than those of conventional generators, which complicates road and/or railway transport and onsite assembly. The most frequent solution is the design of electric generators wherein the stator, rotor or both are modular.

Additionally, in order to increase the magnetic field and optimise the quantity of active materials, gap width must be as small as possible. At the same time, in order for the achieved torque to be constant, gap dimensions must be constant, i.e. they must not vary due to vibrations of the wind rotor and the mechanical shaft. Consequently, in order to guarantee minimum and constant gap width, one of the most frequent solutions in generator structure design has been to give it great rigidity, resulting in very high overall assembly weight.

In short, two of the main requirements which must be fulfilled by a direct drive generator are a modular design that will allow transport thereof by road and a structural design that will ensure constant gap width and moderate weight. In the state of the art there are different references to large-sized and modular generators which attempt to resolve these problems, some of which are mentioned briefly below.

EP 2063115 proposes the design of a generator having a modular stator and rotor wherein the modules of both comprise an active part for generating power (windings and steel in the case of the stator, magnets in the case of the rotor) and a structural part for preventing deformations and transmitting stator and rotor loads to four support elements disposed at the front and rear part, two for each of the stator and rotor (in FIG. 3, stator supports 26 and 27 and rotor supports 18 and 19). The dimensions thereof are such that the joins therebetween are disposed at a smaller generator shaft radius than that of the gap, in such a manner that both the nacelle and the bearing structure can be transported. However, assembly thereof in the wind turbine is not resolved by the proposed design.

U.S. Pat. No. 5,844,341, as in the case of EP 2063115, discloses a generator wherein the joins of both the stator and rotor modules are disposed at a distance smaller than or equal to the gap (FIG. 2 and FIG. 3). This patent also indicates an assembly process wherein fixation of the stator modules to the structure is carried out individually and allows adjustment of the distance from the rotor modules once these have been assembled, allowing adjustment of gap dimensions. This avoids a complicated alternative wherein the stator must be assembled in a single piece around the rotor, given the high attraction forces and small margin, and with the same width as that of the gap (page one of said patent). However, the stator of an electric generator must normally be of the distributed winding-type in order to achieve greater gap torque homogeneity. When the generator comprises a stator of this type, electrical connections must be made between the windings of the different modules. Additionally, with this solution the connections must be made at height, increasing the difficulty and therefore the time required for this type of operation.

U.S. Pat. No. 7,456,534 discloses an electric generator being considerably larger in diameter than in length. Said document indicates assembly of the generator stator prior to assembly of the rotor, subsequently assembling each rotor section individually on the stator. In a large-sized generator, said assembly must be carried out at the wind turbine installation site, due to transport restrictions. Despite not being clearly specified, there are two alternatives for said process. In the first alternative, both the stator and the rotor are assembled on the ground and the assembly is subsequently hoisted to the top of the tower. In the second alternative, the stator is assembled on the tower and the rotor sections are subsequently assembled one by one thereon. The main drawback of the aforementioned method, particularly in the case of magnet rotors, is the difficulty of the operation due to the forces of attraction between said magnets and the magnetic material of the stator, in this case laminated steel, added to the complexity of performing said process at height.

As mentioned earlier, another major challenge in a multi-megawatt wind turbine equipped with a large-sized electric generator is minimising gap width and ensuring that the dimensions do not vary substantially during operation without substantially increasing the rigidity of the electric generator structure, which would imply an increase in the weight and cost of the structural part thereof and, consequently, an increase in the rest of the structural parts of the wind turbine (frame, tower, etc.). DE 10255745 discloses a solution consisting of disposing bearings near the gap (FIG. 2). The main drawback is the existence of a single bearing for both the wind rotor and the electric generator rotor. This causes all the loads and vibrations to be transmitted to the stator structure which, therefore, must be dimensioned so as to support it, guaranteeing adequate dimensional gap tolerances, with the ensuing increase in material and cost.

DESCRIPTION OF THE INVENTION

According to a first aspect of the invention, the inventors of the present application have developed a novel electric generator, preferably of the direct drive-type, the rotor of which is formed by a structure whereto a plurality of rotor excitation element-carrying modules are coupled, for example magnets, said rotor excitation element-carrying modules being radially movable in relation to the central shaft of the generator. In the present patent, the term "radially movable" relates to movements having a significant radial component, even if combined with axial or tangential components. In fact, in the example that will be described in detail hereunder, the magnet-carrying modules have a circumferential sector shape and, therefore, in order to dispose these in a retracted position while preventing certain elements from coming into contact with adjacent elements, axial and tangential movements must be combined. In any case, the main concept is that the radial movement component allows reduction of the maximum dimensions of the rotor on certain occasions, which is not only convenient for allowing transport thereof by road, but also eases wind turbine assembly and maintenance operations, as will be explained in detail hereunder.

Preferably, the rotor excitation element-carrying modules, for example magnets, are movable between at least two positions:

1) A retracted position wherein the distance between the magnet-carrying modules and the stator is substantially greater than the gap. Preferably, the size of the rotor when the magnet-carrying modules are in a retracted position is such as to allow transport by road and/or railway. Said maximum dimensions depend on the legislation of the different countries but normally the width of said element must not exceed 4.2 m in order to allow transport thereof. For this reason, in a preferred embodiment the diameter of the rotor with the magnet carriers in retracted position is less than or equal to 4.2 m.

2) An extended position wherein the distance between the magnet-carrying modules and the stator is equal to the gap width. Therefore, when the generator is assembled with the magnet-carrying modules in the extended position it is ready to start working.

In both cases, the distance between the magnet-carrying modules and the stator is considered to be the minimum distance measured radially.

This means that if the conventional gap width in this field, which would correspond to the extended position, ranges between several millimeters and 2 centimeters, the distance between the magnet-carrying modules and the stator in the retracted position could be up to 100 centimeters. Therefore, when the magnet-carrying modules are in the retracted position, the maximum rotor dimensions can be up to 2 meters less compared to a conventional rotor with fixed magnets, thereby facilitating transport and assembly operations. Moreover, the increase in distance between the rotor and the stator when the magnet-carrying modules are in the retracted position not only eases assembly of the rotor in the interior of the stator as a consequence of the greater maneuvering space when the rotor is introduced into the stator, but also simplifies handling of both parts due to the decrease in the magnetic forces that appear therebetween. Additionally, the magnet-carrying modules are preferably housed in the interior of the rotor structure when these are in the retracted position and are therefore protected against blows during transport and assembly.

According to another preferred embodiment of the invention, the generator comprises guiding means that direct the movement of the magnet-carrying modules from the retracted position to the extended position. Preferably, they are guides or projections disposed in the magnet-carrying modules that cooperate with respective guides or complementary projections disposed on the rotor structure.

In another preferred embodiment of the invention, the generator comprises means for controlling the movement speed of the magnet-carrying modules, such as for example hydraulic jacks or pulleys. The stator comprises windings and a core that defines the fixed part of the magnetic circuit. These speed control means are particularly necessary when the stator core is formed from ferromagnetic material which, on moving the magnet-carrying modules from their retracted position towards their extended position when the rotor is already housed in the interior of the stator, causes the appearance of intense forces of attraction between the magnet-carrying modules and the stator core. The movement speed control means serve to prevent this magnetic force from causing the magnet-carrying modules to slide uncontrollably.

The generator of the invention also preferably comprises means of fixation to the magnet-carrying modules in the retracted position that prevent these from sliding freely along the guides during transport and assembly.

In relation to the extended position, two possible solutions for maintaining the gap as constant as possible are disclosed. Firstly, a preferred embodiment of the invention comprises means for fixing the magnet-carrying modules to the rotor structure in the extended position which allow adjustment of said extended position for different gap widths. Said fixation means maintain the position of the magnet-carrying modules fixed in relation to the rotor structure. These could be fixation means with some fixed positions separated by one or several millimeters which allow adjustment of gap width throughout the perimeter thereof.

Secondly, in another preferred embodiment of the invention spacer elements disposed in the gap or nearby are used to maintain its width constant. These spacer elements are disposed between the magnet-carrying modules and the stator, and are preferably chosen from among mechanical bearings, magnetic bearings and sliding contacts, and keep the gap constant and uniform without having to excessively increase the rigidity and, therefore, the weight of the generator structure. In this case, the fixing means used to join the magnet-carrying modules to the rotor structure allow certain movement thereof in relation to the rotor structure, being the spacer elements in charge of maintaining the distance between the outer surface of the magnet modules and that of the stator constant.

Both if the fixing means between the magnet-carrying modules and the rotor structure allow or do not allow relative movement between the magnet-carrying modules and the rotor structure, and the magnet-carrying modules are fixed in defined positions in relation to the rotor structure, in a preferred embodiment the fixing means used are elastic. This characteristic allows buffering of possible vibrations from the magnet-carrying modules associated to the variation in the forces whereto the magnet-carrying modules are subjected in their movement when the rotor rotates. The variation in forces can be due, among other aspects, to the presence of cogs in the ferromagnetic core of the stator, lack of precision in generator manufacturing, current harmonics introduced through the stator or other.

In a preferred embodiment, the magnet-carrying modules comprise spacer element fixing means. Said spacer elements may be, for example, mechanical bearings the shaft of which is solidarily joined to the magnet-carrying modules. In a preferred embodiment, each magnet-carrying module comprises at least two mechanical bearings, one on the front part of the magnet-carrying module and another on the back part. Said mechanical bearings, on rotating the generator rotor, rotate around at least one shaft which is solidarily joined to the magnet-carrying module and roll, in turn, along tracks disposed on the stator. In this manner, the distance between the magnet-carrying modules and the stator remains constant, thereby maintaining gap width when the generator is in operation. Worth mentioning is the fact that, in the event that the magnet-carrying modules are movable in the extended position in relation to the rotor structure, this characteristic prevents movements or rotations of the rotor structure from resulting in variations in gap dimensions, as the width thereof is limited by the spacer elements.

In a preferred embodiment, the magnet-carrying modules comprise joining elements which allow joining to adjacent magnet-carrying modules, said join being elastic and allowing at least a certain degree of movement of a magnet-carrying module in relation to the adjacent module. In one embodiment the magnet-carrying modules incorporate two mechanical bearings, one on the front part of the magnet-carrying module and another on the rear part which are joined, in turn, to the adjacent module by an articulated joint, which allows rotation in three directions in relation to the adjacent module. In this manner, each magnet-carrying module comprises three supports, two on the stator and one on the adjacent magnet-carrying module. Therefore, when the generator rotor rotates, the contact between all the mechanical bearings on the stator track and the rotor adapts to a possible lack of precision in rotor manufacturing, for example, ovalling thereof, always maintaining the gap width constant.

According to another preferred embodiment, in order to maintain the gap as constant as possible, the generator comprises springs fixed to the rotor structure and to the magnet-carrying modules, in such a manner that these exert a force on said magnet-carrying modules in order to guarantee contact of the spacer elements that will tend to maintain the gap dimensions constant. These springs are particularly necessary when the stator core is formed from a non-ferromagnetic material, in such a manner that there are no forces of attraction between the magnet-carrying modules and the stator. Consequently, in this case it is necessary to apply a force to the magnet-carrying modules in order to ensure that these remain in the extended position.

In another preferred embodiment of the invention, the generator is disposed between the tower and the wind turbine blades. Specifically, the rotor is coupled in a rotary manner to the wind turbine frame by means of at least one main bearing, while the stator structure comprises a rear element fixed to the wind turbine frame.

In a preferred embodiment, the stator structure also comprises a front element that leans in a rotary manner against the rotor shaft by means of an auxiliary bearing.

According to another preferred embodiment, the rotor of the generator of the invention is formed by a central module configured for coupling thereof in a rotary manner to the wind turbine frame and a plurality of outer modules, each of which comprises at least one magnet-carrying module. In this context, "plurality" refers to two or more outer modules. Preferably, the size of an outer rotor module when the magnet-carrying modules or modules are in the retracted position is such that it allows transport by road.

In a preferred embodiment, the outer modules are radially movable in relation to the central module. In turn, the magnet-carrying modules are also radially movable in relation to the outer modules. Therefore, in order to move the magnet-carrying modules from a retracted position to an extended position, the magnet-carrying modules remain in an intermediate position between the retracted position and the extended position when the outer modules are extended. According to this embodiment, in order to pass from a retracted position to an extended position:

Firstly, the outer modules are radially moved from a retracted position in relation to the central module, whereupon the magnet-carrying modules remain in an intermediate position.

Secondly, the magnet-carrying modules are radially moved in relation to the outer modules, passing from an intermediate position to an extended position.

Said configuration allows a compromise solution to be reached between maximising the distance between the rotor and the stator in the retracted position and minimising the distance between the magnet-carrying modules, as an intermediate space between these is required for each to be radially movable without interfering in their movement. Additionally, it allows minimisation of the rotor dimensions with the outer modules and magnet-carrying modules retracted, thereby easing transport operations, as the rotor can be transported together with the nacelle, and assembly operations, as it is no longer necessary to hoist the outer modules together with the magnet-carrying modules one by one.

According to another preferred embodiment, the stator core is composed of a plurality of arch-shaped segments. Said core is fixed to the frame by means of the stator structure.

According to another preferred embodiment, each stator structure element comprises a central module configured for fixation thereof to the wind turbine frame and a plurality of outer modules, configured for fixation thereof to the central module. In this case, the stator core is fixed to the outer modules of the stator structure. In this manner, the dimensions of the central module of the stator structure are smaller than the maximum allowed for transport thereof by road and/or railway.

In a preferred embodiment, the magnet-carrying modules are also inwardly collapsible in relation to the rotor structure. This eases maintenance work, enabling access to the stator and to the rotor magnets from the interior of the generator. Likewise, this option allows minimisation of rotor dimensions with the magnet-carrying modules in the retracted position and certain magnet-carrying modules in a collapsed position in relation to the rotor structure. For example, one out of every four magnet-carrying modules is collapsible.

Another aspect of the present invention is aimed at an assembly process of a wind turbine having a rotor formed by a structure whereto a plurality of rotor excitation element-carrying modules are coupled, for example, magnets which are radially movable in relation to the central shaft of the generator between at least a retracted position and an extended position, which comprises the following steps:

1) Assembling the rotor to the wind turbine frame maintaining the rotor excitation element-carrying modules in their retracted position.

The rotor may be manufactured from a single piece or be modular. In a particular embodiment wherein the rotor is formed by a central module configured for coupling thereof in a rotary manner to the wind turbine frame and a plurality of outer modules, each of which comprises at least one magnet-carrying module, assembly of the rotor comprises, firstly, the central module and, next, fixing the outer modules to the central module.

2) Next, assembling the stator to the wind turbine frame.

The dimensions of the electric generator stator exceed the limits established for transport by road and/or railway, due to which manufacture thereof is modular. In this case, assembly thereof comprises assembling the constituent segments of the stator core on the ground, making the necessary electrical connections to complete the winding and, next, hoisting the assembled stator and fixing it to the wind turbine frame. In any case, as the stator is disposed around the rotor when the magnet-carrying modules are in their retracted position, there is much more maneuvering space, which facilitates the operation and reduces the possibility of damaging the rotor due to fortuitous blows. Additionally, due to the greater separation between the rotor and stator magnets, the magnetic forces generated are minimised.

3) Next, moving the magnet-carrying modules from the retracted position to the extended position.

Finally, once all the elements have been fixed, the magnet-carrying modules are moved to the extended position, where the distance between the rotor and the stator is substantially equal to the gap, whereupon the generator is ready to start working.

Any person skilled in the art will understand that the rotor excitation elements can be, equivalently to the magnets proposed in the invention, copper windings or superconductive windings: in this case, the magnet-carrying modules will be called winding-carrying modules.

Likewise, any person skilled in the art, in light of the present specification, will understand that the invention is comparable to an inverted generator wherein the rotor is external to the stator, and infer an equivalent generator design and assembly process thereof for said inverted generator.

BRIEF DESCRIPTION OF THE DRAWINGS

FIGS. 1a and 1b show an example of a generator equipped with a modular rotor and stator wherein the magnet-bearing modules are respectively in a retracted and extended position.

FIG. 2 shows a detailed view of a rotor module with two magnet-carrying modules retracted in the interior thereof.

FIGS. 3a and 3b respectively show a general view of the end of a wind turbine which uses the generator of the present invention and a detailed view of the distance between the rotor and the stator, wherein the magnet-carrying modules are disposed in a retracted position in both cases.

FIGS. 4a and 4b respectively show a general view of the end of a wind turbine which uses the generator of the present invention and a detailed view of the distance between the rotor and the stator, wherein the magnet-carrying modules are disposed in an extended position in both cases.

PREFERRED EMBODIMENT OF THE INVENTION

Figure 5:
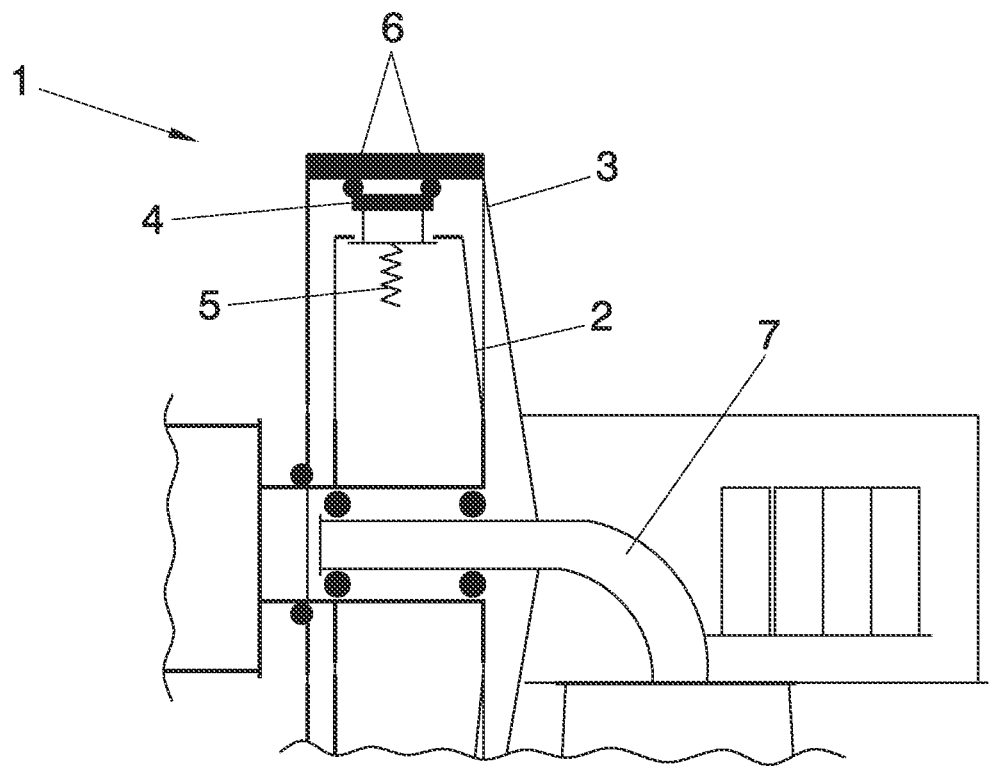
FIG. 5 shows another example of a generator according to the invention, wherein the magnet-carrying modules are separated from the stator by means of spacers and wherein springs exert a force on said magnet-carrying modules which tends to maintain them in their extended position.

An example of embodiment of the present invention relating to a generator (1), the rotor (2) and stator (3) of which are both modular, as can be observed in FIGS. 1a and 1b, is described below. The rotor (2) comprises a central module (2a) and four outer modules (2b, 2c, 2d, 2e) fixed therearound. In turn, each outer module (2b, 2c, 2d, 2e) is equipped in this example with two magnet-carrying modules (4) (only represented in the outer module (2e)). Additionally, the stator core (3) is also formed of several segments. Further, the stator (3) structure consists, in a manner similar to that of the rotor (2), of a central module (2a) and several outer modules (2b, 2c, 2d, 2e).

When the magnet-carrying modules (4) are in a retracted position, as shown in FIG. 1a, they are housed inside the rotor structure (2) and therefore protected against fortuitous blows or scratches which can occur during transport or assembly thereof, also guaranteeing a minimum distance between the magnets and any metallic element susceptible of being attracted by said magnets. The extended position is shown in FIG. 2b, whereupon the distance between the magnet-carrying modules (4) and the stator (3) is equal to that of the generator gap (1). It can be observed in the figures how the movement of the magnet-carrying modules (4) has, in addition to the radial component perpendicular to the generator shaft (1), a tangential component necessary for housing these in the interior of the outer modules (2b, 2c, 2d, 2e). As a result, the magnet-carrying modules (4) in a retracted position are protected in the interior of the outer module (2b, 2c, 2d, 2e), as shown in FIG. 2. Additionally, due to the smaller size of the outer modules (2b, 2c, 2d, 2e), it facilitates transport thereof by road.

When the magnet-carrying modules (4) are in a retracted position, as shown in FIG. 1a, they are housed inside the rotor structure (2) and therefore protected against fortuitous blows or scratches which can occur during transport or assembly thereof, also guaranteeing a minimum distance between the magnets and any metallic element susceptible of being attracted by said magnets. The extended position is shown in FIG. 1b, whereupon the distance between the magnet-carrying modules (4) and the stator (3) is equal to that of the generator gap (1). It can be observed in the figures how the movement of the magnet-carrying modules (4) has, in addition to the radial component perpendicular to the generator shaft (1), a tangential component necessary for housing these in the interior of the outer modules (2b, 2c, 2d, 2e). As a result, the magnet-carrying modules (4) in a retracted position are protected in the interior of the outer module (2b, 2c, 2d, 2e), as shown in FIG. 2. Additionally, due to the smaller size of the outer modules (2b, 2c, 2d, 2e), it facilitates transport thereof by road.

Logically, as previously explained herein, the movement of the magnet-carrying modules (4) will be guided by guiding means which can consist of stubs disposed on the magnet-carrying modules (4) which slide along corresponding grooves disposed on the rotor structure (2). Neither have the fixing means that will immobilise the magnet-carrying modules (4) in the retracted and extended position been represented, although these could possibly be cotter pins with one or several positions, or the radial position thereof could be adjusted by means of threaded bolts. Likewise, although not represented here either, control means that will maintain the sliding speed of the magnet-carrying modules (4) within certain safety limits, particularly when the stator (3) core is made of ferromagnetic material which, on interacting with the magnet-carrying modules (4), will cause the appearance of a magnetic force that tends to move said modules (4) towards the stator (3).

FIG. 5 also shows the case wherein the generator (1) does not have fixing means in an extended position, but rather spacer elements (6) disposed between the magnet-carrying modules (4) and the stator (3) are used, which will ensure that the gap remains constant and equal to the desired value without need for an extremely rigid and heavy structure. It is understood that the use of spacer elements (6) is also compatible with generators (1) having a stator (3) core made of ferromagnetic material, in which case it would be the magnetic force which would "push" the magnet-carrying modules (4) against the spacer elements (6). In the event that the stator (3) core is not made of ferromagnetic material, springs (5) joined to the rotor structure and to the magnet-carrying modules guarantee the effect of said spacer elements (6), ensuring that the gap remains constant.

Figure 7:
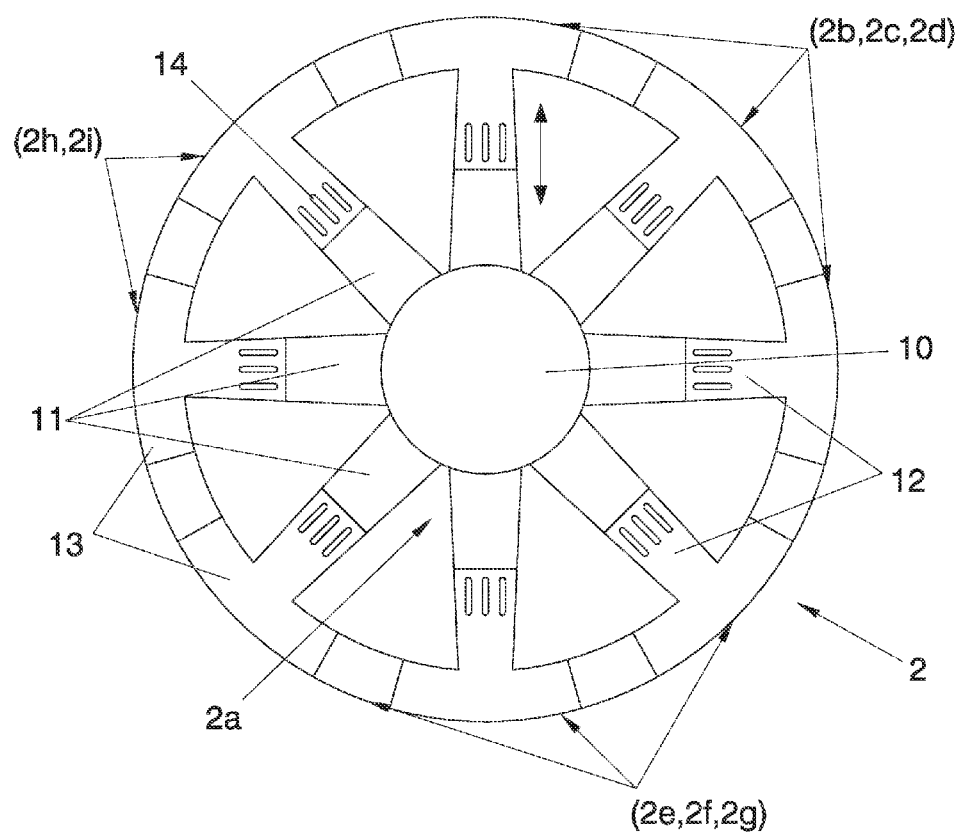
FIG. 7 shows a schematic front view of an example of embodiment of a rotor of an electric generator wherein the outer modules of the rotor structure are radially movable.

FIG. 7 shows a diagram of a generator (1) rotor (2) according to a preferred embodiment wherein the rotor (2) structure is formed by a central module (2a) and a plurality of outer modules (2b, 2c, 2d, 2e, 2f, 2g, 2h, 2i). The central module (2a) is formed by a cylindrical shaft (10) and first arms (11) which extend radially. The outer modules (2b, 2c, 2d, 2e, 2f, 2g, 2h, 2i) are formed by second arms (12) which are an extension of the first arms (11) of the central module (2a) and torque transmission elements (13) whereto the magnet-carrying modules (4) are fixed. Said outer modules (2b, 2c, 2d, 2e, 2f, 2g, 2h, 2i) are radially movable in relation to the central module (2a).

In order to enable said movement, the first and second arms (11, 12) of the central module (2a) and of the outer modules (2b, 2c, 2d, 2e, 2f, 2g, 2h, 2i) incorporate first guiding means (14). The guiding means (14) allow variation between a retracted position of the outer modules (2b, 2c, 2d, 2e, 2f, 2g, 2h, 2i) and an extended position of the outer modules (2b, 2c, 2d, 2e, 2f, 2g, 2h, 2i). Additionally, the rotor (2) structure incorporates first blocking means for guaranteeing fixation of the outer modules (2b, 2c, 2d, 2e, 2f, 2g, 2h, 2i) in a retracted position, which corresponds to a transport position of the outer modules (2b, 2c, 2d, 2e, 2f, 2g, 2h, 2i) and second blocking means for guaranteeing fixation of the outer modules (2b, 2c, 2d, 2e, 2f, 2g, 2h, 2i) in an extended position, which corresponds to an operating position of the outer modules (2b, 2c, 2d, 2e, 2f, 2g, 2h, 2i). The first guiding means (14) comprises projections (19). Said projections (19) in an embodiment comprise a thread and, by means of nuts fixed to the projections (19), outer modules (2b, 2c, 2d, 2e, 2f, 2g, 2h, 2i) can be blocked in either retracted or in the extended position, being the extended position adjustable if necessary.

In turn, the magnet-carrying modules (4) are also radially movable with respect to outer modules (2b, 2c, 2d, 2e, 2f, 2g, 2h, 2i) by second guiding means (15) disposed on the torque transmission elements (13). Therefore, in order to move the magnet-carrying modules (4) from a retracted position to an extended position, the magnet-carrying modules (4) remain in an intermediate position between the retracted and extended position, when the outer modules (2b, 2c, 2d, 2e, 2f, 2g, 2h, 2i) are in the extended position. According to this embodiment, on passing from a retracted position to an extended position:

Firstly, the outer modules (2b, 2c, 2d, 2e, 2f, 2g, 2h, 2i) move radially from a retracted position in relation to the central module (2a), whereupon the magnet-carrying modules (4) remain in an intermediate position.

Secondly, the magnet-carrying modules (4) move radially in relation to the outer modules (2b, 2c, 2d, 2e, 2f, 2g, 2h, 2i), passing from the intermediate position to the extended position.

Figure 8:
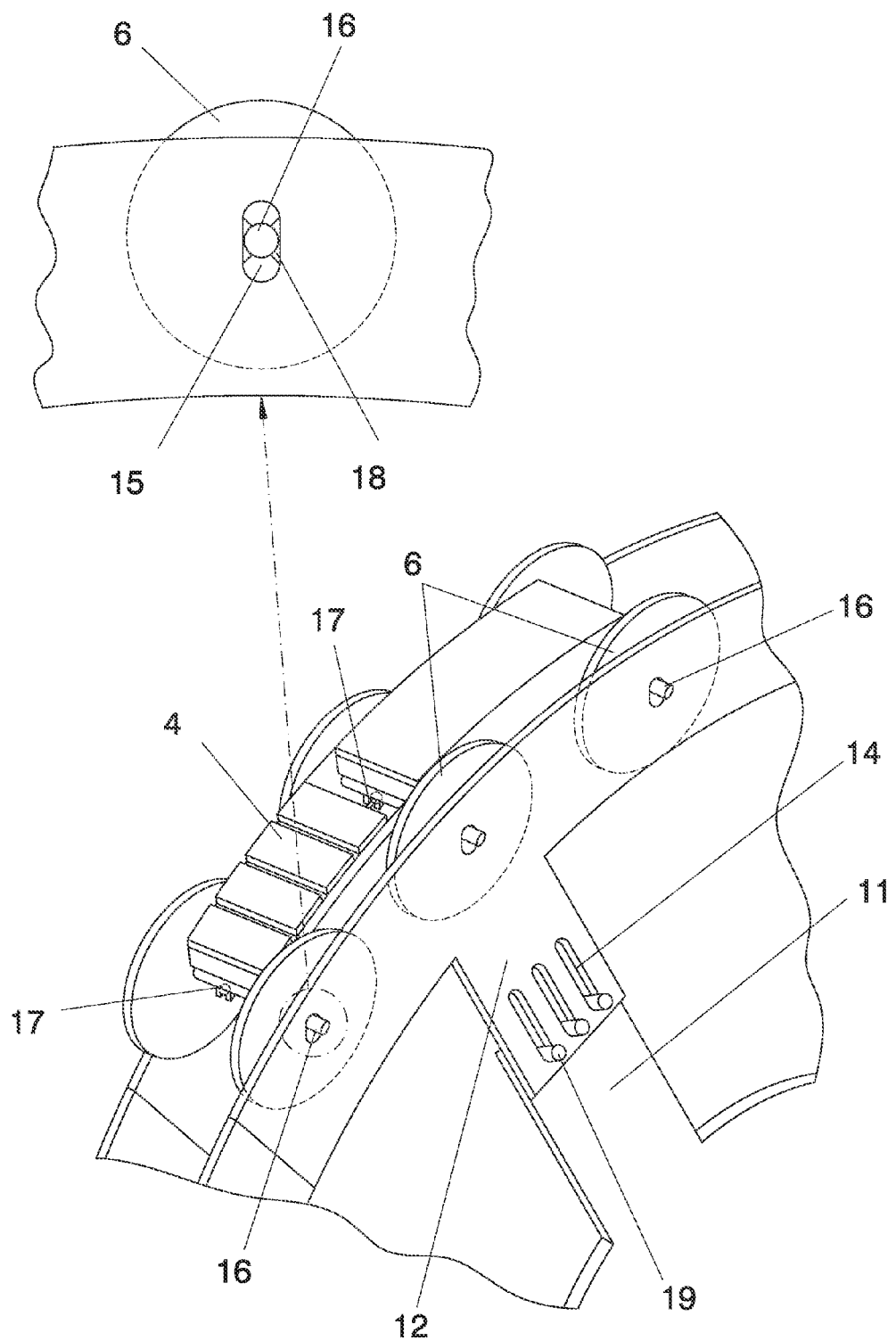
FIG. 8 shows a detailed perspective view of the example of embodiment corresponding to FIG. 7.
Figure 9:
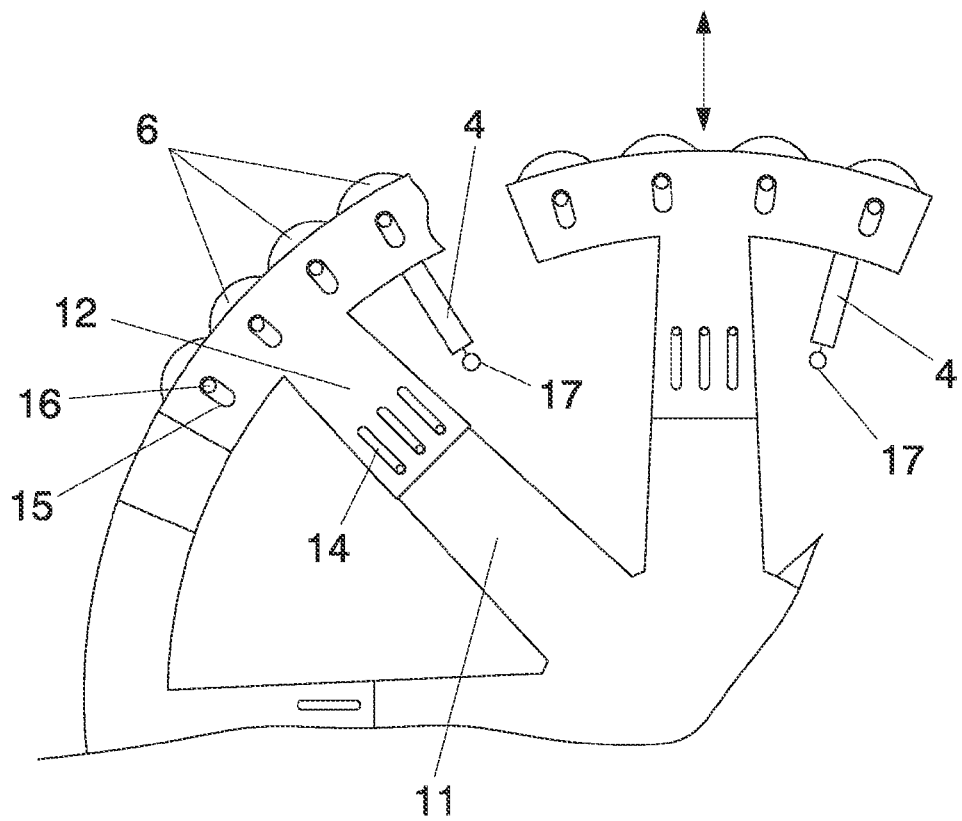
FIG. 9 shows a detailed front view of the example of embodiment corresponding to FIG. 7.

Said FIG. 7 and, in greater detail, FIGS. 8 and 9, show a join between the magnet-carrying modules (4) and the rotor structure (2) which enables relative movement between the magnet-carrying modules (4) and the rotor (2) structure. Said join, in a preferred embodiment, incorporates in turn elastic means, such as for example silent blocks. This characteristic allows buffering of possible vibrations of the magnet-carrying modules (4) associated to the variation in forces whereto the magnet-carrying modules (4) are subjected during movement thereof when the rotor (2) rotates.

According to said embodiment, the spacer elements (6) are mechanical bearings the shaft of which is solidarily joined to the magnet-carrying modules (4). Each magnet-carrying module (4) comprises at least two mechanical bearings, one on the front of the magnet-carrying module (4) and another on the rear part. Said mechanical bearings, on rotating the generator (1) rotor (2), rotate around at least one shaft (16) solidarily joined to the magnet-carrying module (4) and roll, in turn, along tracks disposed in the stator (3). In this manner, the distance between the magnet-carrying modules (4) and the stator (3) remains constant, thereby maintaining gap width constant when the generator (1) is working.

In one embodiment, the magnet-carrying modules (4) comprise joining elements (17) which enable joining thereof with the adjacent magnet-carrying modules, allowing at least a certain degree of movement of a magnet-carrying module (4) in relation to the adjacent module (4). In one embodiment, the magnet-carrying modules (4) incorporate two mechanical bearings, i.e. spacer elements (6), one on the front part of the magnet-carrying module (4) and another on the rear part, which are in turn joined to the adjacent module (4) by means of an articulated joint which allows rotation in three directions in relation to the adjacent module (4).

FIG. 9 shows the example of embodiment wherein the magnet-carrying modules (4) are also inwardly collapsible in relation to the rotor structure (2). For example, one out of every four magnet-carrying modules (4) is collapsible.

Figure 6A:
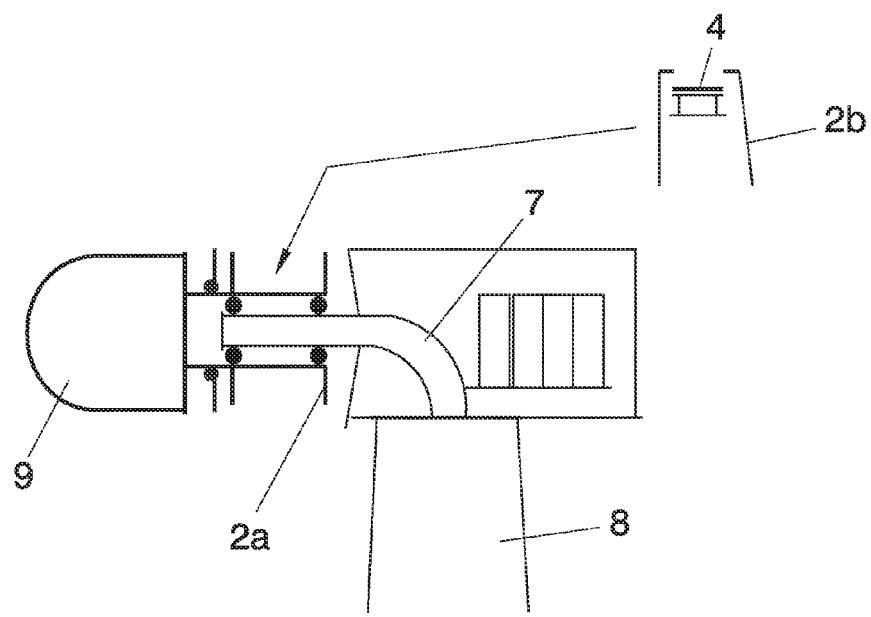
FIGS. 6a to 6e show different steps of an example of the assembly process of a wind turbine according to the invention.
Figure 6B:
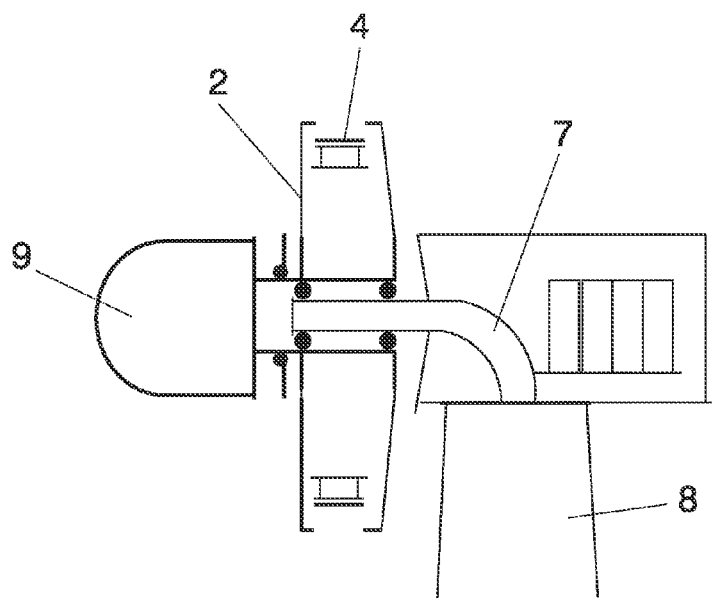

An example of embodiment of a wind turbine assembly process is described below, making reference to FIGS. 6a to 6e. FIG. 6a shows the inner module (2a) of the rotor (2) already assembled on the frame (7) disposed at the end of the wind turbine, whereupon each of the outer modules (2b, 2c, 2d, 2e) must be fixed to said inner module (2a) until the rotor (2) is fully assembled and disposed in its final position, as shown in FIG. 6b. It can be observed that the magnet-carrying modules (4) of each outer module (2b, 2c, 2d, 2e) are in a retracted position.

Figure 6C:
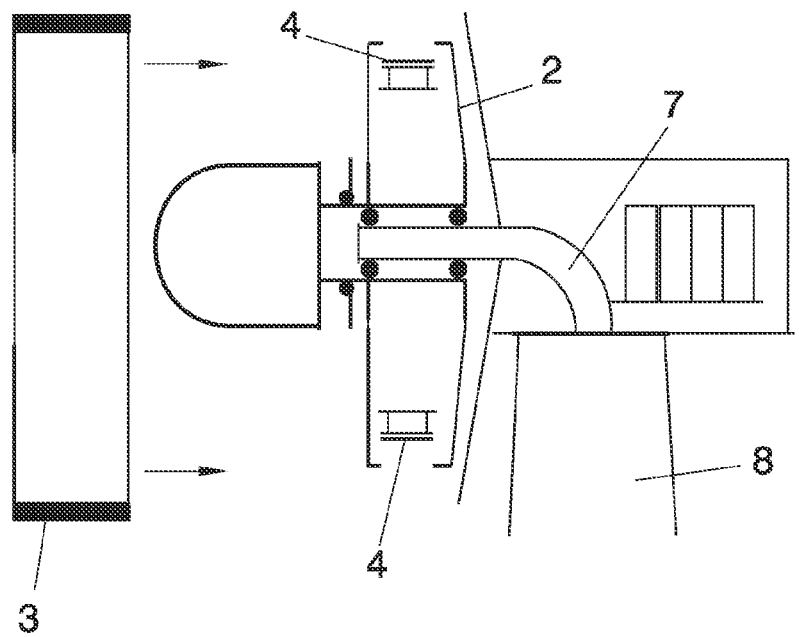
Figure 6D:
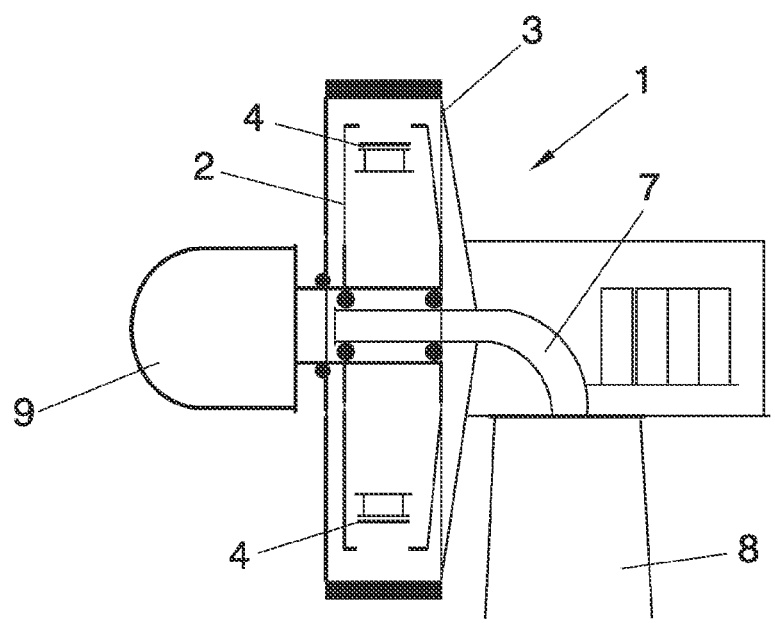
Figure 6E:
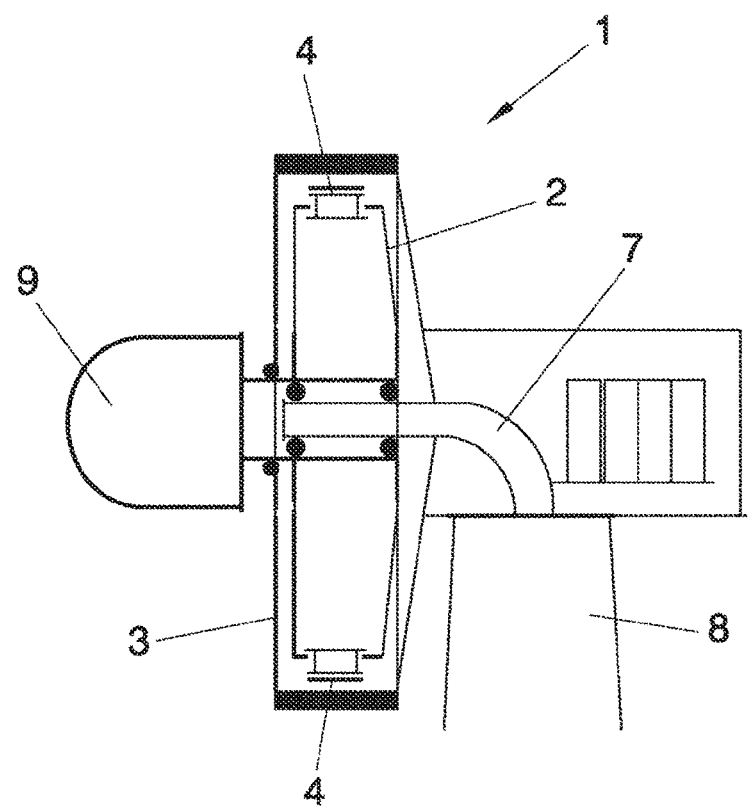

Next, the different constituent segments of the stator (3) core are assembled, the necessary electrical connections for completing the winding are made and it is hoisted for coupling to the frame (7) and to the rotor (2) shaft in its final position. This step incorporates the greatest advantages of the invention, as the annular space that separates the rotor (2) from the stator (3) is much larger than the gap (as shown in FIG. 3b), which causes a significant reduction in the magnetic forces that appear between the rotor (2) and the stator (3) and provides more maneuvering space for the installation. This step is represented in FIG. 6c, obtaining the wind turbine of FIG. 6d as a result.

Finally, the magnet-carrying modules (4) are moved throughout the guiding means from the retracted position to the extended position, whereupon the distance between the rotor (2) and the stator (3) remains the same as the gap. The movement of the magnet-carrying modules (4) can be carried out, if the stator (3) core is made of ferromagnetic material, by simply allowing the magnetic attraction between said magnet-carrying modules (4) and the stator (3) to act, braking using the control means. If the stator does not have permanent magnets, other means can be used to control the movement of the modules until taking these to their final position. Once in the extended position, they can be blocked in that position through fixing means or using the spacer elements (6) also shown in FIG. 5.

This application claims priority to a Spanish patent application (ES 201031248) filed on Aug. 11, 2010, the contents of which are incorporated by reference.

The invention claimed is:

1. An electric generator for a wind turbine, comprising a frame, a rotor and a stator, the rotor of which is formed by a rotor structure whereto a plurality of rotor excitation element-carrying modules are coupled, wherein the rotor excitation element-carrying modules are radially movable in relation to a central axis of the generator, wherein the rotor excitation element-carrying modules comprise magnets, and wherein the rotor excitation element-carrying modules are radially movable between at least:
 a refracted position wherein the distance between the rotor excitation element-carrying modules and the stator is substantially larger than a gap having a gap width, wherein the refracted position is configured to minimize the magnetic forces between the rotor and the stator; and
 an extended position wherein the distance between the rotor excitation element-carrying modules and the stator is equal to the gap width.

2. The electric generator of claim 1 wherein, in the refracted position, the rotor excitation element-carrying modules are housed in an interior of the rotor structure.

3. The electric generator of claim 1, which further comprises a means for fixing the rotor excitation element-carrying modules in the retracted position.

4. The electric generator of claim 1, which further comprises a means for fixing the rotor excitation element-carrying modules in an extended position which allows adjustment of the extended position for different gap widths.

5. The electric generator of claim 1, wherein the diameter of the rotor is less than or equal to 4.2 m, when the rotor excitation element-carrying modules are in a retracted position.

6. The electric generator of claim 1, wherein the stator comprises a core composed of a plurality of arch-shaped segments.

7. The electric generator of claim 1, wherein a stator structure comprises a central module configured for fixation thereof to the frame and a plurality of outer modules configured for fixation thereof to the central module and whereto the stator core is in turn fixed.

8. The electric generator of claim 1, wherein at least one rotor excitation element-carrying module is collapsible in relation to the rotor structure.

9. A wind turbine which comprises the electric generator of claim 1, and further comprising blades, wherein the blades are directly coupled to the rotor without using a multiplier.

10. The electric generator of claim 1, which further comprises a guiding means that guide a radial movement of the rotor excitation element-carrying modules.

11. The electric generator of claim 10, wherein the guiding means comprise guides or projections disposed on the rotor excitation element-carrying modules which cooperate with respective guides or complementary projections disposed on the rotor structure.

12. The electric generator of claim 1, wherein the rotor excitation element-carrying modules are radially movable in relation to the structure.

13. The electric generator of claim 12, which further comprises an elastic fixing means for fixing the rotor excitation element-carrying modules to the rotor structure.

14. The electric generator of claim 12, which further comprises spacer elements disposed in the gap or nearby to maintain its width constant.

15. The electric generator of claim 14, wherein the spacer elements are selected from among mechanical bearings, magnetic bearings, and sliding contacts.

16. The electric generator of claim 15, which further comprises springs fixed to the structure and to the rotor excitation element-carrying modules, in such a manner that they exert a force on said rotor excitation element-carrying modules which maintains them in the extended position.

17. The electric generator of claim 15, wherein the rotor excitation element-carrying modules comprise a means for fixing the spacer elements.

18. The electric generator of claim 17, wherein the rotor excitation element-carrying modules comprise joining elements which allow joining thereof to adjacent rotor excitation element-carrying modules, the joint being such as to provide a rotor excitation element-carrying module with a certain degree of freedom of movement in relation to the adjacent rotor excitation element-carrying module.

19. The electric generator of claim 18, wherein the joining elements comprise an elastic means.

20. The electric generator of claim 18, wherein the joining elements comprise an articulated joint.

21. The electric generator of claim 18, wherein each of the rotor excitation element-carrying modules comprise corresponding spacer elements and corresponding joining elements for maintaining the gap width constant.

22. The electric generator of claim 1, wherein the rotor is formed by a central module configured for coupling thereof in a rotary manner to the frame and a plurality of outer modules each of which comprising at least one rotor excitation element-carrying module.

23. The electric generator of claim 22, wherein the size of one of the plurality of outer modules of the rotor is less than or equal to 4.2 m, when at least one rotor excitation element-carrying module is in a retracted position.

24. The electric generator of claim 22, wherein the plurality of outer modules are movable in relation to the central module.

25. The electric generator of claim 24, wherein the rotor excitation element-carrying modules are radially movable in relation to the plurality of outer modules.

26. A process for assembling a wind turbine, which comprises an electric generator having a rotor which is formed by a structure configured for coupling thereof in a rotary manner to a frame of the wind turbine, whereto a plurality of rotor excitation element-carrying modules, which are radially movable in relation to a central axis of the generator between at least a retracted position wherein magnetic forces between the rotor and a stator are minimized, and an extended position, are coupled, wherein the process comprises:
 assembling the rotor on the wind turbine frame, maintaining the rotor excitation element-carrying modules in the retracted position;
 assembling the stator on the frame of the wind turbine; and
 moving the rotor excitation element-carrying modules from the retracted position to the extended position;
 wherein the rotor excitation elements comprise magnets; and
 wherein the retracted position of the rotor excitation element-carrying modules is achieved by maintaining the rotor excitation element-carrying modules separated from the stator by a distance substantially larger than a gap having a gap width.

27. The process for assembling a wind turbine of claim 26, wherein the rotor is formed by a central structural module configured for coupling thereof in a rotary manner to the frame and a plurality of outer structural modules each of which comprises at least one rotor excitation element-carrying module, wherein assembly of the rotor comprises the following steps:
- assembling the frame on the central structural module of the rotor structure; and
- fixing the plurality of outer structural modules to a central structural module.

28. The process for assembling a wind turbine of claim 26, wherein the stator is modular, and wherein assembly of the stator comprises the following steps:
- assembling in situ segments that constitute a stator core and windings; and
- hoisting the stator and fixing it to the wind turbine frame.

* * * * *